(12) United States Patent
Bordini et al.

(10) Patent No.: US 7,644,942 B2
(45) Date of Patent: Jan. 12, 2010

(54) ACTIVE AXLE SUSPENSION SYSTEM

(75) Inventors: Giorgio Bordini, Formigine (IT); David T. Rach, Plainfield, IL (US); Loreto Panettone, Yorkville, IL (US); Brian E. Felsing, Park Ridge, IL (US)

(73) Assignee: CNH America LLC, New Holland, PA (US)

( * ) Notice: Subject to any disclaimer, the term of this patent is extended or adjusted under 35 U.S.C. 154(b) by 481 days.

(21) Appl. No.: 11/689,610

(22) Filed: Mar. 22, 2007

(65) Prior Publication Data

US 2008/0231011 A1    Sep. 25, 2008

(51) Int. Cl.
*B60G 9/02*     (2006.01)
(52) U.S. Cl. .................. 280/124.112; 280/124.116; 280/5.507
(58) Field of Classification Search .......... 280/124.116, 280/124.112, 124.11, 124.111, 5.514, 5.507
See application file for complete search history.

(56) References Cited

U.S. PATENT DOCUMENTS

| | | | |
|---|---|---|---|
| 2,732,902 A | 1/1956 | Barenyi | |
| 3,007,715 A | 11/1961 | Maharick | |
| 3,420,543 A | 1/1969 | Strifler et al. | |
| 3,921,742 A | 11/1975 | May et al. | |
| 3,953,040 A | 4/1976 | Unruh et al. | |
| 4,415,179 A | 11/1983 | Marinelli | |
| 5,074,580 A | 12/1991 | Wagner et al. | |
| 5,312,123 A * | 5/1994 | Hurlburt | 280/93.503 |
| 5,322,309 A * | 6/1994 | Hurlburt | 280/124.113 |
| 5,322,310 A * | 6/1994 | Hurlburt | 280/124.113 |
| 5,340,138 A * | 8/1994 | Hurlburt | 280/93.504 |
| 5,447,320 A * | 9/1995 | Hurlburt | 280/93.504 |
| 5,447,321 A * | 9/1995 | Hurlburt et al. | 280/93.504 |
| 5,476,150 A * | 12/1995 | Hurlburt et al. | 180/53.7 |
| 5,476,276 A | 12/1995 | Hurlbut | |
| 5,513,875 A | 5/1996 | Tahara et al. | |
| 5,639,119 A | 6/1997 | Plate et al. | |
| 5,778,569 A | 7/1998 | Schaeff | |
| 5,879,016 A | 3/1999 | Altherr et al. | |
| 6,182,989 B1 | 2/2001 | Negele | |
| 6,322,090 B1 | 11/2001 | Chignoli et al. | |
| 6,331,010 B1 | 12/2001 | Chino et al. | |
| 6,477,455 B2 | 11/2002 | Panizzolo | |
| 6,502,840 B1 | 1/2003 | Leyonhjelm et al. | |
| 6,523,844 B2 | 2/2003 | Panizzolo | |
| 6,607,204 B2 | 8/2003 | Krone et al. | |
| 6,637,762 B2 | 10/2003 | Bublies et al. | |
| 6,843,489 B2 | 1/2005 | Woody et al. | |
| 7,144,022 B2 * | 12/2006 | Bordini | 280/124.109 |
| 7,168,716 B2 | 1/2007 | Shimizu et al. | |
| 7,510,198 B2 * | 3/2009 | Rach et al. | 280/124.112 |
| 2002/0093153 A1 | 7/2002 | Scotese et al. | |
| 2004/0080134 A1 * | 4/2004 | Sap et al. | 280/124.114 |
| 2006/0038371 A1 | 2/2006 | Bordini | |

* cited by examiner

FOREIGN PATENT DOCUMENTS

FR    2570029 A1    6/1985

*Primary Examiner*—Paul N Dickson
*Assistant Examiner*—Drew Brown
(74) *Attorney, Agent, or Firm*—Patrick M. Sheldrake; John William Stader; Michael G. Harms (57) ABSTRACT

An active suspension system for a rigid beam tractor axle in which the axle is connected to the chassis by two orthogonally oriented pivot points and axle movement is controlled by double-acting suspension actuators managed by a control system to improve the ride and handling characteristics of the tractor.

20 Claims, 7 Drawing Sheets

ACTIVE AXLE SUSPENSION SYSTEM

BACKGROUND OF THE INVENTION

The present invention relates generally to suspension systems for vehicles and more particularly to suspension systems for agricultural tractors and other off-road vehicles.

In the farm machinery sector, agricultural tractors are well-known typically comprising front and rear laterally extending axles having wheels rotatably affixed at the ends with a longitudinally elongated box body, or chassis, connecting the axles. Rear axles are commonly rigidly connected to the chassis, there is no suspension between the rear axle and the tractor frame. Tire deflection alone provides a cushioning between a rough surface and the tractor frame. In many tractors, the front wheels are driven in addition to the rear driven wheels, the tractor having four wheel drive. Economics and simplicity typically dictate that rigid front axle assemblies be used in lieu of an independently articulated front suspension. Front axles are typically hingeably attached to the front of the tractor chassis to rotate, transversely with respect to the longitudinal axis of the chassis, around a respective hinge axis located proximate to the longitudinal middle of the axle. With this axle structure, when one front wheel is raised to overcome an obstacles the other front wheel has to come down the same distance.

The productivity of an agricultural tractor can be increased by enabling faster travel speeds in the field and on the road. Limiting factors to the travel speed of an agricultural tractor when traveling over rough surfaces are operator comfort and wheel traction. Faster travel speeds highlight shortcomings in the conventional hingeably-attached rigid front axle, especially when both wheels simultaneously encounter a similar obstacle, such as a ditch. When both wheels must move in the same direction to traverse an obstacle, the entire front end of the vehicle is forced to move in the same vertical direction, Tractor front axle suspensions solve these problems by enabling the entire axle to move in relation to the tractor frame. By damping such motion traction and operator comfort may be increased both of which may contribute to increased productivity. Additionally, front axle suspensions for tractors provide better high-speed handling characteristics during high-speed operation on roads. The addition of more sophisticated actuators and control systems to these suspension systems further extend the capabilities of the tractor and provide additional improvements in vehicle ride and handling.

It would be a great advantage to provide an active suspension system for a rigid beam tractor axle that increases traction, improves the ride and handling characteristics of the tractor, and provides sufficient wheel turning capability to retain accepted vehicle maneuverability, all while retaining a simple, cost-effective rigid front axle member to overcome the above problems and disadvantages.

SUMMARY OF THE INVENTION

Accordingly, it is an object of the present invention to provide a suspension system for an agricultural tractor axle improves ride quality while traversing uneven terrain.

It is a further object of the present invention to provide a suspension system for an agricultural tractor axle that dampens axle motion while allowing axle oscillation sufficient to maintain wheel contact with the ground while traversing uneven terrain.

It is a further object of the present invention to improve vehicle maneuverability by providing a suspension system capable of adjusting axle position in relation to the vehicle frame thereby enabling the steering wheels to be turned at greater angles.

It is a further object of the present invention to provide an axle suspension that improves tractor handling characteristics during high-speed roading.

It is a further object of the present invention to provide an axle suspension system capable of responding to extreme axle oscillations in order to limit impact stresses placed on the vehicle frame thereby improving ride quality and reducing the structural demands on the axle mounting frame.

It is a further object of the present invention to provide a tractor axle suspension capable of sharing an axle housing design with non-suspended tractors thereby reducing manufacturing complexity.

It is a still further object of the present invention to provide an axle suspension for a tractor that improves ride quality while traversing uneven terrain thereby reducing operator fatigue and increasing productivity.

It is a still further object of the present invention to provide an axle suspension that is durable in construction, inexpensive of manufactures carefree of maintenance, easily assembled, and simple and effective to use.

These and other objects are achieved by providing a suspension system for a rigid beam tractor axle in which the axle is connected to the chassis by two orthogonally oriented pivot points and axle movement is controlled by double-acting hydraulic cylinders managed by a control system to improve the ride and handling characteristics of the tractor.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connections, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right", "up" or "down," or top or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
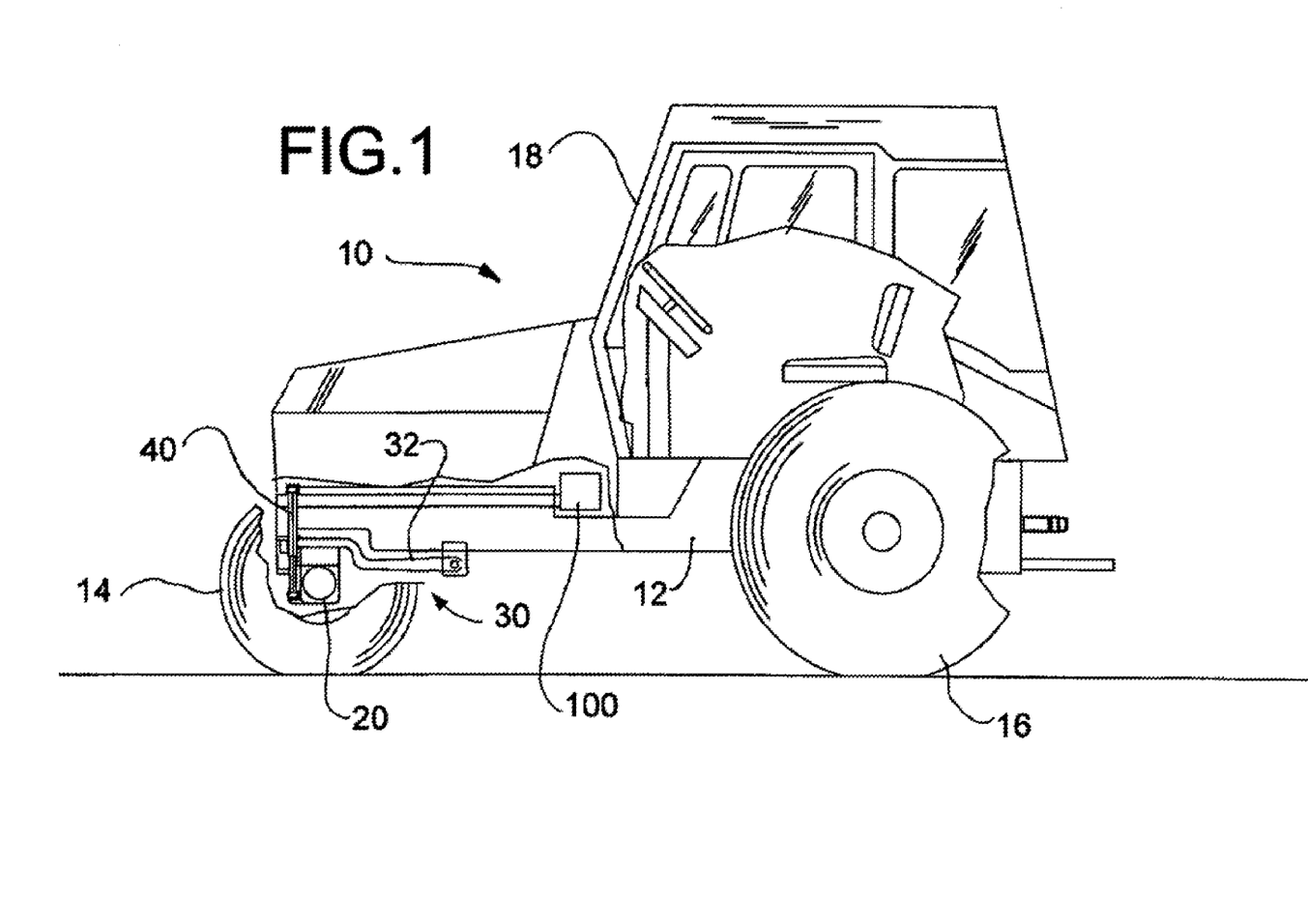
FIG. 1 is a side view of an agricultural tractor of the type which the present invention is advantageous.

FIG. 1 shows the primary components of a typical and generally well known agricultural tractor 10, namely a frame 12, front wheels 14 (only one shown), rear wheels 16 (only one shown), and an operators cab 18. In a conventional tractor, front axle 20 is typically connected to chassis 12 by a centrally-positioned pin generally aligned with the longitudinal forward-rearward axis of the tractor that limits axle movement to pivoting about the axle pivot pin. Front wheels 14 (only one shown) are pivotably connected to left and right opposing ends of front axle 20, selective movement of which enables tractor 10 to be steered. The present invention improves upon a conventional high-centered mounted pivot for front axle 22 through the addition of suspension apparatus 30. In the present invention, axle pivot pin 22, instead of being connected directly to frame 12, is connected to an axle carrier 32 which itself is pivotally attached to frame 12 by carrier pivot 34 in a manner that allows axle pivot pin 22 to translate in upward and downward direction relative to frame 12. The orientation of carrier pivot 34 is generally perpendicular to the longitudinal forward-rearward axis of the tractor. Motion of front axle 20 is controlled by a pair of hydraulic cylinders 40 connected at one end to front axle 20 and to frame 12 at their opposing ends. Movement of hydraulic cylinders 40, whether extending or retracting, is directed by control system 100, which may comprise sensors, controllers, a fluid reservoir, a pump, and the necessary hydraulic valves to direct axle 20 movement in relation to the frame 12.

Hydraulic cylinders 40 are described in the preferred embodiment as an economical solution as most tractors are equipped with hydraulic systems capable of providing the motive force to actuate the cylinders. Other types of actuators (e.g., pneumatic, electromagnetic and the like) offering similar functionality, that is capable of selective extension and retraction while providing sufficient force, may be used with the present invention. Vehicles having on-board pneumatic systems or adequate electrical power can easily use these alternative means of motive force for the suspension actuators. The description herein describes hydraulic actuators as the preferred embodiment as a matter of convenience. Use of such similarly functional actuators is not precluded by and is anticipated by this disclosure.

A skilled designer will also note that the invention as described herein for application on a front axle may also be applied to rear or intermediate axles on a vehicle with similar effectiveness. Such application is contemplated within the scope of the present invention. The description continues as applicable to a front axle for clarity and convenience.

Figure 2:
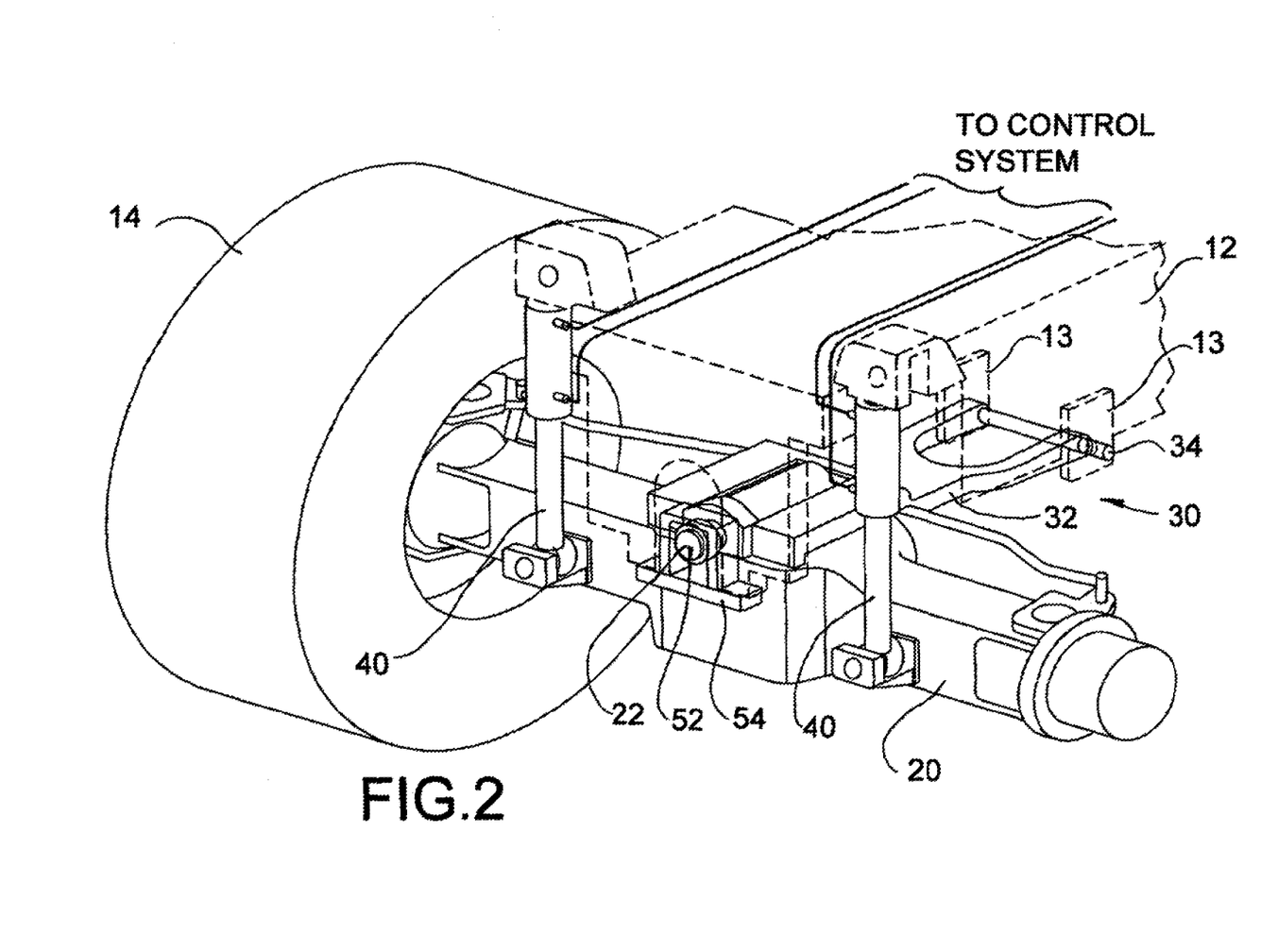
FIG. 2 is a partial perspective view of the frame and front axle of an agricultural tractor showing the preferred embodiment of the present invention

Now referring to FIG. 2, a partial isometric view of suspension apparatus 30 shows the connection of front axle 22 to axle carrier 32 in greater detail. The rearward portion of carrier 32 is connected to frame 12 by carrier pivot 34. The forward portion of carrier 32 provides a connection for front axle pivot pin 22. As carrier 32 pivots about carrier pivot 34, front axle pivot pin 22 moves in generally upward/downward directions relative to frame 12. Vertical movement of front axle 20 is used to lessen the impact to the tractor when the front wheels 14 encounter obstacles that require them to simultaneously move in the same direction. This vertical axle pivot movement also allows the tractor frame 12 to remain at a generally consistent distance from the ground when one wheel encounters an obstacle, rather than forcing the frame upward as the opposing wheel is forced downward, movement of the carrier maintains the frame in a generally constant location.

Upward/downward movement of axle 20 is limited by a guide member 52 and a guide member receiving structure, referred to as travel limiter 54. In the preferred embodiment, guide member 52 is a portion of front axle pivot pin 22 extending beyond the pivot connections of the front axle 20 and the axle carrier 32. Travel limiter 54 constrains motion of guide member 52 to generally upward/downward directions, relative to the tractor, thereby limiting lateral loading on the carrier pivot 34 and enabling a less robust structure to be used for the carrier and carrier pivot. Axle carrier 32 in the preferred embodiment is laterally narrow, preferably no wider than the tractor frame 12 in the same longitudinal region, so that the degree to which the front wheels 12 may be steered in right or left directions is unaffected by the addition of the suspension apparatus 30. Travel limiter 54 allows front axle 20 to move vertically through a limited range of motion.

Front axle 20 motion is further controlled by a pair of hydraulic cylinders 40, positioned one on either side of the front axle pivot pin 22. Hydraulic cylinders 40 are preferably double-acting cylinders capable of moving axle 20 in either direction regardless of the then-present loading on the axle. Hydraulic cylinders 40 are retracted and extended independently as the conditions created by vehicle movement over the ground require. As the tractor moves along the ground and the wheels engage an obstacle, front wheels 14 may move vertically by pivoting of front axle 20 about front axle pivot pin 22. The control system sensing changes in wheel position, responds by adjusting one or both hydraulic cylinders 40. By positioning guide member 52 in an intermediate position within travel limiter 54, front axle 20 may move vertically in an upward or downward direction responsive to obstacles encountered by front wheels 14 thereby allowing the vehicle frame height above the ground to remain generally unchanged and preventing vehicle pitching due to the obstacle.

Figure 5:
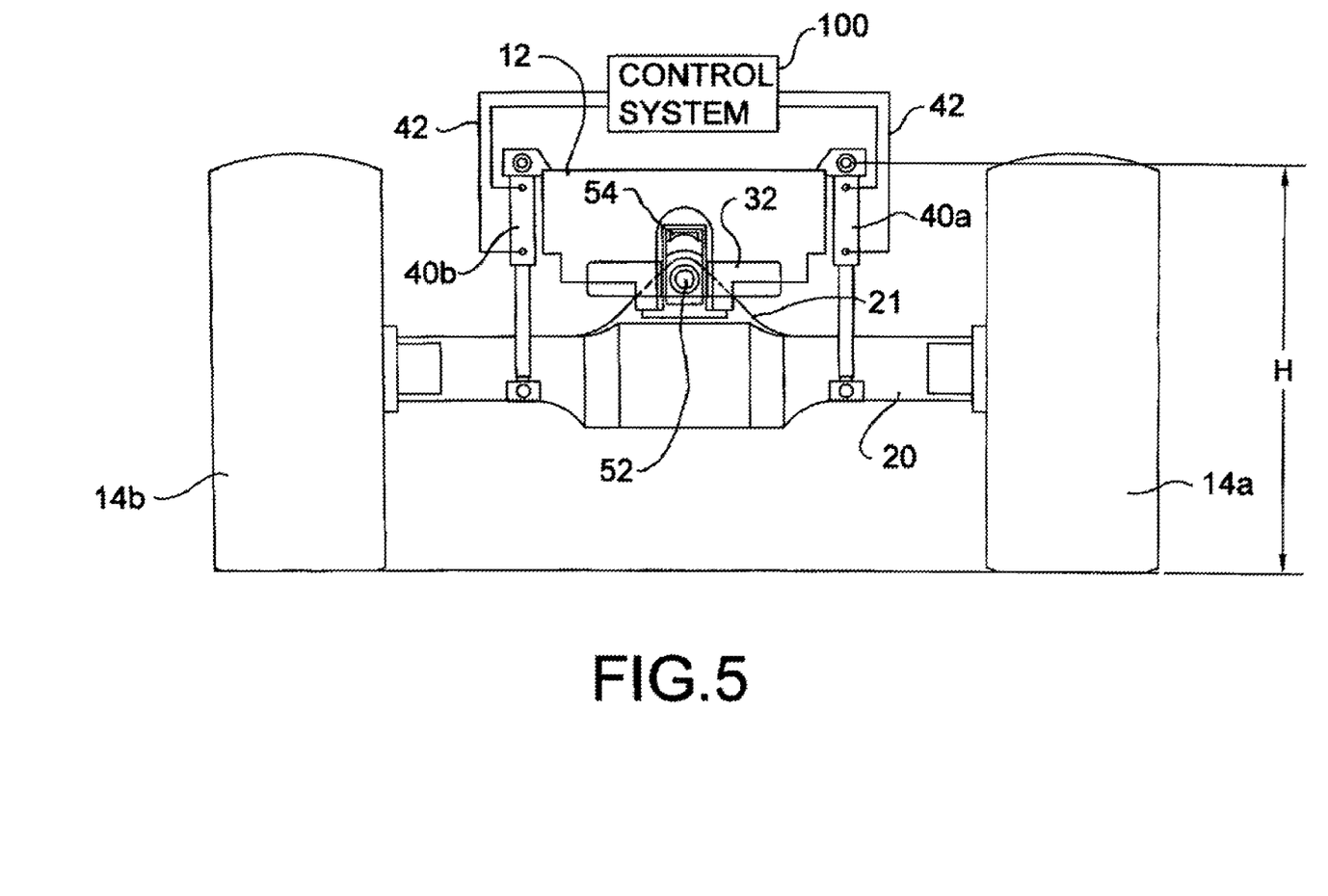
FIG. 5 is a front view of the suspension apparatus as it would be positioned when the vehicle is on level ground.
Figure 6:
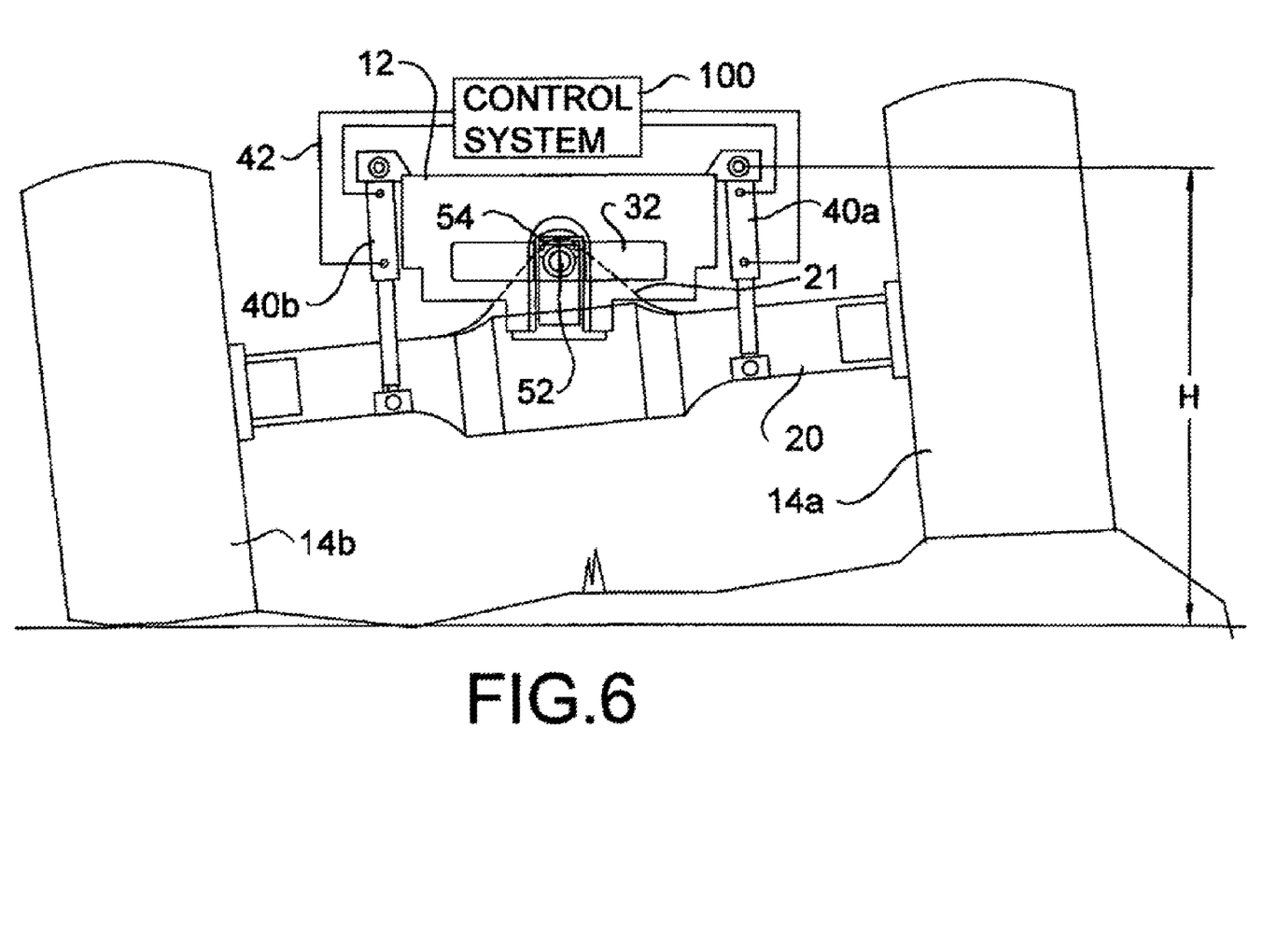
FIG. 6 is a front view of the suspension apparatus as it would be position when one of the wheels encounters a bump and shows how the apparatus improves the vehicle ride.

The hydraulic cylinders 40 are separately controlled by a control system 100 (shown in FIGS. 1, 5 and 6). By adjusting the pressure and flow of hydraulic fluid to each cylinder, the control system allows each front wheel to act independently as it engages a bump or a hole in the ground. When one wheel rises over a bump, the hydraulic cylinder 40 on that side will be adjusted to allow the axle 20 to pivot (or oscillate). To prevent the opposing wheel from being forced to oscillate in the opposite direction, the hydraulic cylinder 40 on the side engaging the bump will also allow the axle carrier 32 to pivot and adjust the position of the axle pivot pin 22. The opposing hydraulic cylinder is also adjusted as required to maintain near-equal loading on the tires, ensuring that both tires remain in contact with the ground and that the general position of the vehicle relative to the ground remains unchanged (e.g., the vehicle does not lurch upward at it passes the bump). As the hydraulic cylinders 40 are capable of powered movement in two directions (extension and retraction), the control system 100 may be programmed to "lift" a wheel encountering a bump thereby lessening the impact of the bump sensed by the tractor operator.

Control system 100 receives inputs from the hydraulic cylinders 40, such as extended/retracted length and cylinder pressure, which are then used by the control system to determine the contour of the ground engaged by the wheels. Additional inputs from the operator may alter the sensitivity of the control system in response to the anticipated terrain undulations or may alter the static position of the axle carrier 32 for the then-present conditions. Other, more sophisticated alternatives employ additional sensors capable of reading the contour of the ground about to be engaged by the wheels and providing a signal to the control system. The control system can then anticipate the obstacles to be engaged by the wheels and initiate axle movements in a manner such that the wheel is moving at the same instant that it encounter the sensed obstacle.

The control system 100 may also be used to reposition hydraulic cylinders 40 to adjust the position of front axle 20 relative to frame 12 such that the forward/rearward pitch of the tractor can be altered. Such capability may be useful when a front end loader or other front-mounted implement is attached to the tractor, when additional ground clearance is needed, or during high speed road transport.

Figure 3:
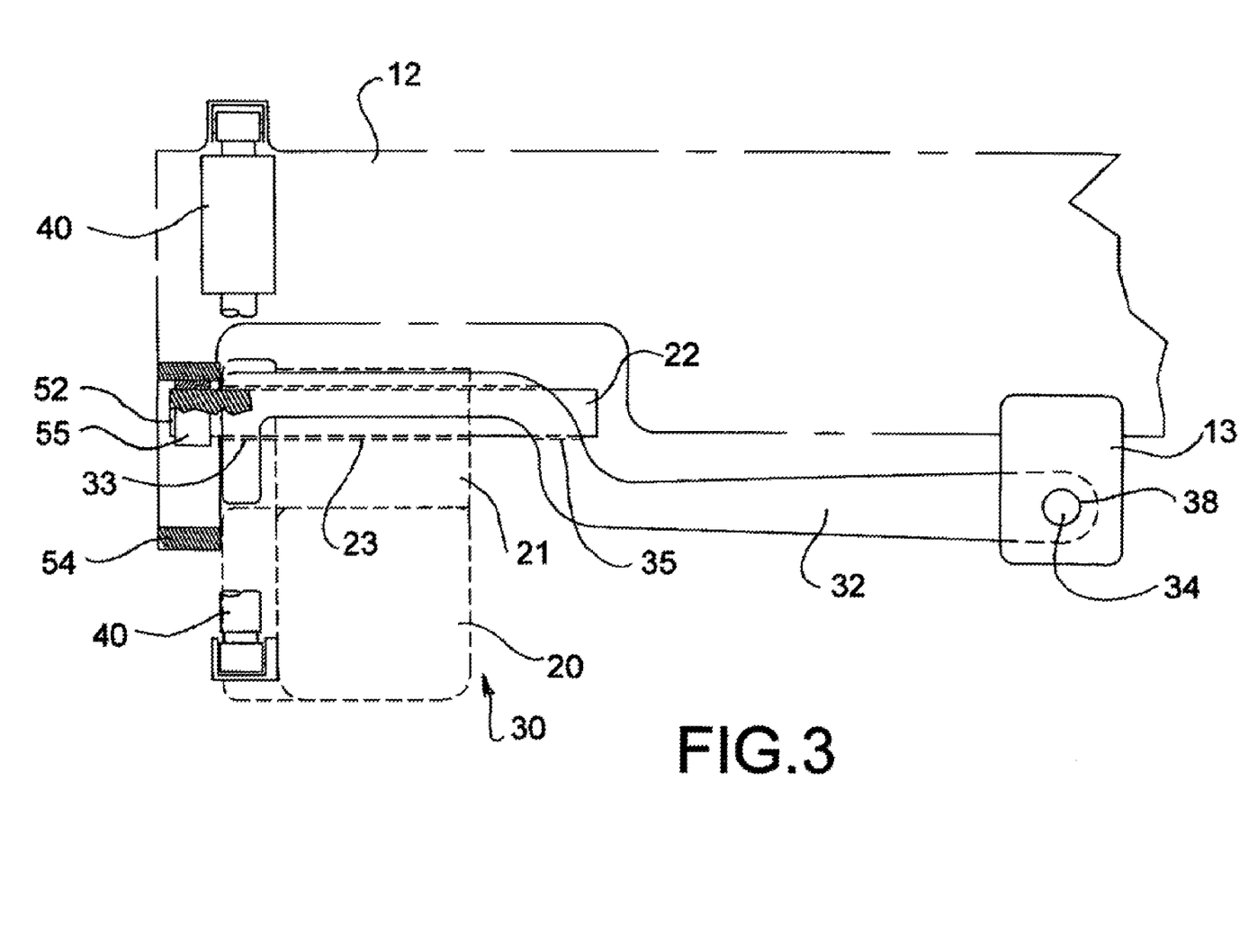
FIG. 3 is a side view of the present invention showing the axle carrier and its connections to the axle and frame.

In FIG. 3, a side elevation view of axle carrier 32 is shown connected to frame 12 by carrier mount 13 and carrier pivot 34. Carrier mounting structure 13 (also shown in FIG. 2) may comprise one or more mounting holes 38 for receiving carrier pivot 34. Similar pivot mounting holes 39 (shown in FIG. 4) are provided in axle carrier 32 and aligned so that a single pin 34 can pass through each bore to establish the pivoting connection. Carrier mounts 13 are spaced apart as allowed by the constraints of tractor frame 12 width to provide lateral torque-resistance. Other known pivot connection methods are contemplated, but a single pin used for carrier pivot 34 provides a simple, strong, and cost-effective means to provide the pivot connection.

Figure 4:
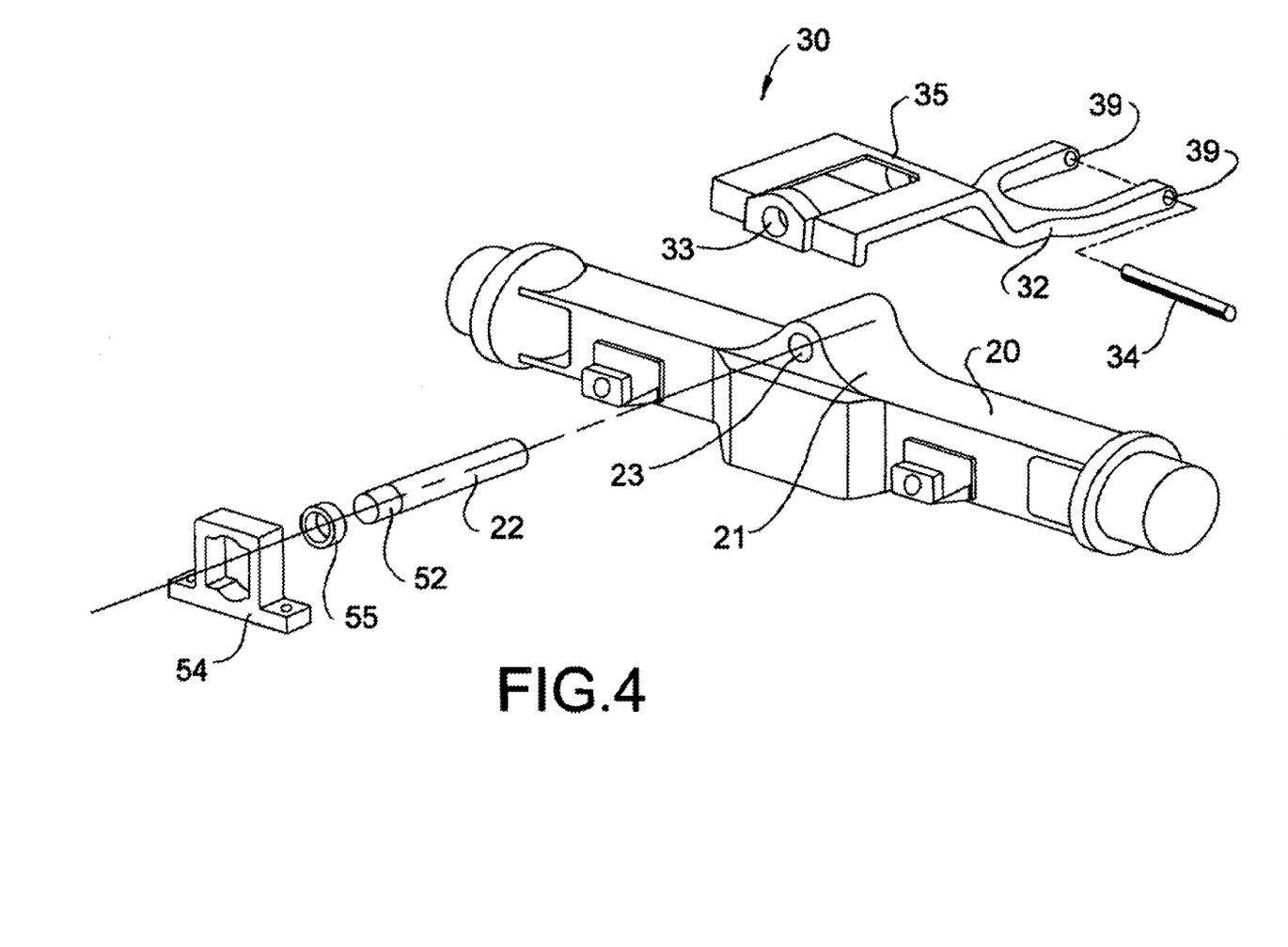
FIG. 4 is an exploded assembly view of the components comprising the axle carrier.

Referring now to FIGS. 3 and 4, front axle 20 is a conventional high-pin rigid beam axle used on many agricultural tractors and other off-road vehicles. Center pivot mount 21 is positioned in the upper part of the casting that forms the body of axle 20 and comprises a cylindrical aperture 23 for receiving pivot pin 22. This pin 22 extends through the cylindrical aperture 23 and into two mating apertures 33, 35 in axle carrier 32 to pivotally connect the front axle 20 to axle carrier 32 in such a manner to enable front axle 20 to oscillate (pivot) about the axle pivot pin 22. The apertures 33, 35 in the axle carrier and the axle pivot aperture 23 are oriented generally parallel to the longitudinal forward-rearward axis of the vehicle. The design of the present invention enables one axle housing assembly to be used in both conventional high-pin center pivoting axles and in conjunction with the axle carrier 32 of the present invention to provide an additional degree of axle control thereby reducing manufacturing complexity and equipment cost. In the preferred embodiment, a portion of pivot pin 22 extends beyond the mounting and pivot structures of the axle-to-carrier connection and interacts with the receiving structure 54. This portion of pivot pin 22 extending beyond the forward carrier aperture 33 becomes the guide member 52. In the preferred embodiment, a roller 55 is connected to guide member to serve as a bearing thereby allowing guide member 52 to move more freely in vertical direction within the travel limiter 54 while allowing tighter clearances in the lateral direction.

FIGS. 5 and 6 illustrate the response of the suspension apparatus as one wheel of the vehicle 10 encounters an obstacle. A simplified discussion of control system 100 is provided to illustrate how the suspension apparatus 30 responds. Those skilled in the art will recognize that numerous control philosophies and characteristics may be used with the present invention to improve vehicle suspension performance. Thus, this description is intended to illustrate rather than limit the disclosure. FIG. 5 depicts the front axle 20 position as the vehicle is traveling across generally level terrain. The hydraulic cylinders 40 are extended so that guide member 52 is positioned toward the downward portion of travel limiter 54. For reference, a nominal vehicle frame height "H" is shown. When one wheel rises over a bump, as shown in FIG. 6, the hydraulic cylinder 40a on that side will be adjusted by the hydraulic control system 100 to allow the axle 20 to pivot (or oscillate) in a manner allowing the wheel 14a to rise over the bump. To prevent the opposing wheel 14b from being forced to oscillate in the opposite direction (downward), axle carrier 32 is allowed to pivot so that the position of the axle pivot pin 22 moves upward. During this cycle, the control system adjusts hydraulic cylinders 40a, 40b, as required, to maintain near-equal loading on the tires, ensuring that both tires remain in contact with the ground and that the general position of the vehicle relative to the ground (dimension "H") remains unchanged (e.g., the vehicle does not lurch upward at it passes the bump). After passing the obstacle (bump), the control system 100 readjusts hydraulic cylinders 40a, 40b to return the suspension apparatus to the normal configuration as shown in FIG. 5.

Figure 7:
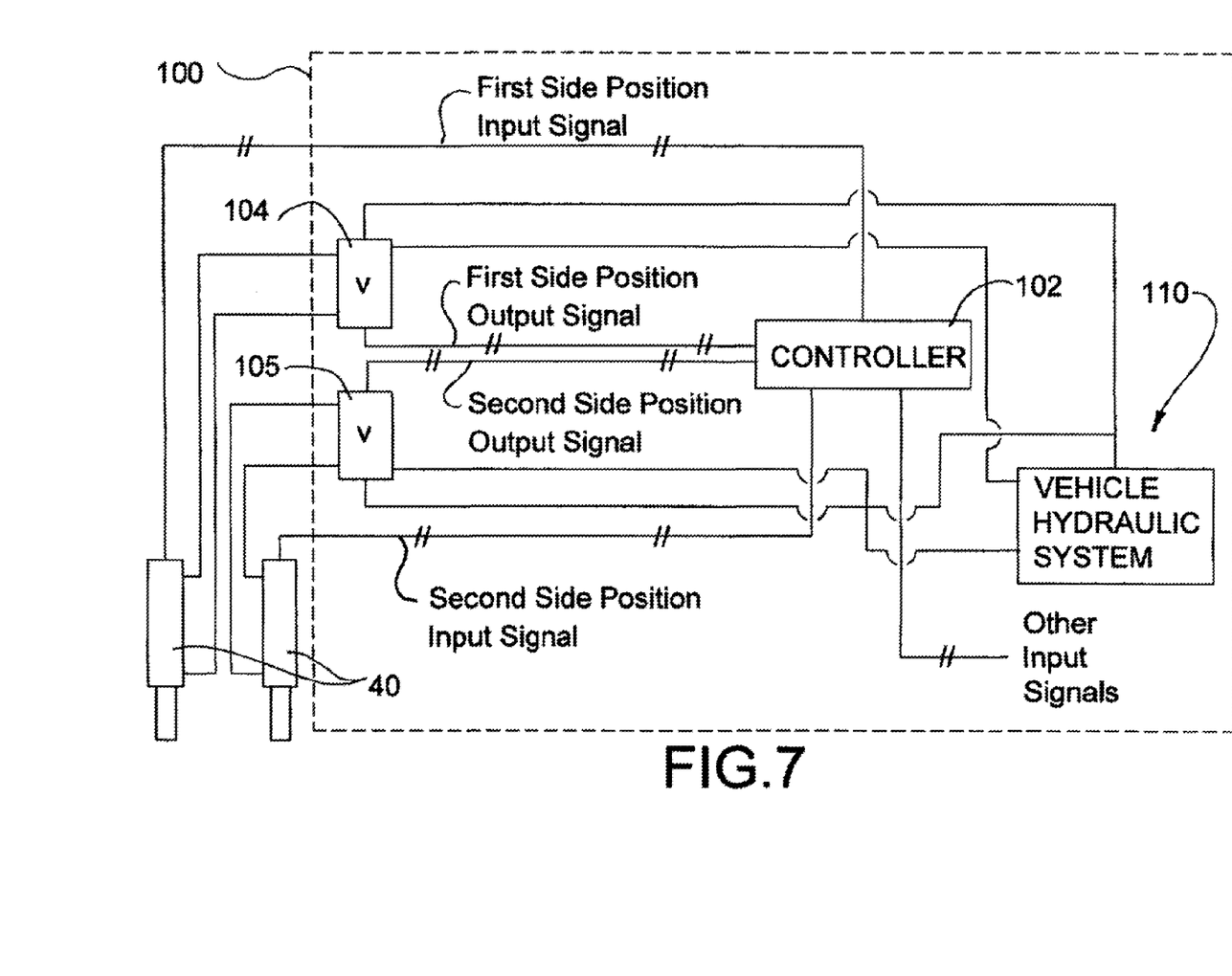
FIG. 7 is a schematic representation of a control system for the active suspension apparatus of the present invention.

Finally, referring to FIG. 7, a simplified schematic diagram of control system 100 showing first and second side hydraulic cylinders 40 which receive pressurized hydraulic fluid from control valves 104, 105. Flow of fluid for each hydraulic cylinder is directed through one of two control lines depending upon the desired direction of hydraulic cylinder 40 movement. Control valves 104, 105 are supplied hydraulic system 110. The position of control valves 104, 105 is directed by controller 102 which receives various vehicle inputs and directs movement of hydraulic cylinders 40 through the operation of the control valves 104, 105. Vehicle inputs may include the position of each hydraulic cylinder 40 (e.g. extended/retracted length), hydraulic cylinder pressure, vehicle pitch angle, and vehicle roll angle. Using the inputs, the control system can determine the force between the wheel and the ground. The control system may also use changes in the readings to respond to changes in ground contour so that force between the wheels and the ground is maintained. More sophisticated control systems might employ terrain reading sensors to examine the approaching terrain and anticipate proper wheel positions to assure a smooth ride and maximum wheel contact with the ground. Terrain reading sensors include such sensors that physically detect ground contour to be encountered by the wheel (e.g. "feelers") as well as sensors capable of detecting ground contour without physical interaction, such as radars and the like.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however concepts, as based upon the description, may be employed in other embodiments without departing from the scope of the inventions.

Having thus described the invention, what is claimed is:

1. A suspension apparatus for an axle of a vehicle, the vehicle having a frame with generally opposing forward and rearward ends defining a longitudinal axis, the suspension apparatus comprising:

an elongate axle carrier having opposing first and second ends generally aligned with said longitudinal axis, a carrier mounting structure affixed adjacent said second end, said mounting structure connecting said carrier to said frame in a manner allowing said carrier to pivot about a first axis generally transverse to said longitudinal axis, and an axle pivot structure disposed adjacent said first end of said carrier and affixed thereto, said axle pivot structure aligned generally parallel to said longitudinal axis;

an axle having a laterally extending central portion with left and right ends and left and right wheels connected respectively thereto for engagement with the ground, said axle pivotally coupled to said axle pivot structure to permit said axle to pivot with respect to said axle carrier about a second axis generally parallel to said longitudinal axis;

a guide member disposed on said forward end of said carrier engaging a receiving structure connected to said frame, said guide member interacting with said receiving structure limiting relative motion of said axle carrier to pivoting motion about said first axis;

left and right suspension actuators connecting said left and right extending portions of said axle, respectively, to said frame, said suspension actuators being selectively movable in first and second opposing directions and extendable or retractable to a desired length whereby extending or retracting selective said actuators modifies the position of said left or right wheels relative to said frame; and a control system for managing the position, extension and retraction, and the rate thereof, of said suspension actuators in response to the contour of the ground engaged by or to be engaged by said wheels thereby controlling pivoting of said axle about said first and second axes.

2. The suspension apparatus as described in claim 1, wherein said suspension actuators are hydraulic cylinders.

3. The suspension apparatus as described in claim 1, wherein said guide member is at least one roller.

4. The suspension apparatus as described in claim 1, wherein said control system actuates said left and right suspension actuators independently of one another.

5. The suspension apparatus as described in claim 4, wherein said control system simultaneously controls pivotal motions of said axle about said first and second axes.

6. The suspension apparatus as described in claim 2, further comprising left and right position signals, each said signal having a value corresponding to the said length of each respective said suspension actuator.

7. The suspension apparatus as described in claim 6, further comprising an apparatus for sensing the contour of the ground engaging each wheel and communicating a signal to said control system.

8. The suspension apparatus as described in claim 7, further comprising an apparatus for sensing the contour of the ground to be engaged by each wheel and communicating a signal to said control system.

9. The suspension apparatus as described in claim 8, wherein said control system actuates said left and right suspension actuators independently of one another.

10. The suspension apparatus as described in claim 9, wherein said control system simultaneously controls pivotal motions of said axle about said first and second axes.

11. The suspension apparatus as described in claim 10, further comprising left and right position signals, each said signal having a value corresponding to the said length of each respective said suspension actuator.

12. The suspension apparatus as described in claim 11, further comprising an apparatus for sensing the contour of the ground engaging each wheel and communicating a signal to said control system.

13. The suspension apparatus as described in claim 12, further comprising an apparatus for sensing the contour of the ground to be engaged by each wheel and communicating a signal to said control system.

14. In an agricultural tractor having a frame with generally opposing forward and rearward ends defining a longitudinal axis, a high pin rigid front axle pivotally connected to the tractor to permit said axle to pivot about an axis generally parallel to the longitudinal axis, the tractor further comprising:

an elongate axle carrier having opposing first and second ends generally aligned with said longitudinal axis, a carrier mounting structure affixed adjacent said second end, said mounting structure connecting said carrier to said frame in a manner allowing said carrier to pivot about a first pivot axis generally transverse to said longitudinal axis, and an axle pivot structure disposed adjacent said first end of said carrier and affixed thereto, said axle pivot structure having a second pivot axis aligned generally parallel to said longitudinal axis and connected to the axle thereby permitting the axle to pivot with respect to said axle carrier about said second pivot axis;

a guide member disposed on said forward end of said carrier engaging a receiving structure connected to said frame, said guide member interacting with said receiving structure limiting relative motion of said axle carrier to pivoting motion about said a first pivot axis;

left and right suspension actuators connecting said left and right extending portions of the axle, respectively, to said frame, said suspension actuators being selectively movable in first and second opposing directions and extendable or retractable to a desired length whereby extending or retracting selective said actuators modifies the position of said left or right wheels relative to said frame; and a control system for managing the position, extension and retraction, and the rate thereof, of said suspension actuators in response to the contour of the ground engaged by or to be engaged by said wheels thereby controlling pivoting of said axle about said first and second pivot axes.

15. The tractor as described in claim 14 wherein said suspension actuators are hydraulic cylinders.

16. The tractor as described in claim 15, wherein said control system actuates said left and right suspension actuators independently of one another.

17. The tractor as described in claim 16, wherein said control system simultaneously controls pivotal motions of said axle about said first and second pivot axes.

18. The tractor as described in claim 17, further comprising left and right position signals, each said signal having a value corresponding to the said length of each respective said suspension actuator.

19. The tractor as described in claim 16, further comprising an apparatus for sensing the contour of the ground engaging each wheel and communicating a signal to said control system.

20. The tractor as described in claim 17, further comprising an apparatus for sensing the contour of the ground to be engaged by each wheel and communicating a signal to said control system.

* * * * *